(12) United States Patent
Wang et al.

(10) Patent No.: US 10,761,509 B2
(45) Date of Patent: Sep. 1, 2020

(54) EFFICIENT METHOD AND SYSTEM FOR AUTOMATICALLY GENERATING DATA POINTS IN A SCADA SYSTEM

(71) Applicant: Honeywell International Inc., Morris Plains, NJ (US)

(72) Inventors: Wayne Wang, Shanghai (CN); Danhua Zhang, Shanghai (CN); Shuang Liang, Shanghai (CN); Wenjing Zhang, Shanghai (CN); Stewart Peake, Heidelberg (AU)

(73) Assignee: Honeywell International Inc., Morris Plains, NJ (US)

( * ) Notice: Subject to any disclaimer, the term of this patent is extended or adjusted under 35 U.S.C. 154(b) by 351 days.

(21) Appl. No.: 15/631,240

(22) Filed: Jun. 23, 2017

(65) Prior Publication Data

US 2018/0373224 A1    Dec. 27, 2018

(51) Int. Cl.
*G05B 19/409* (2006.01)
*H04L 29/08* (2006.01)

(52) U.S. Cl.
CPC .. *G05B 19/409* (2013.01); *G05B 2219/32404* (2013.01); *G05B 2219/32413* (2013.01); *H04L 29/08* (2013.01); *H04L 67/12* (2013.01)

(58) Field of Classification Search
CPC .......... H04L 67/12; G05B 2219/32404; G05B 2219/32413
See application file for complete search history.

(56) References Cited

U.S. PATENT DOCUMENTS

| | | | |
|---|---|---|---|
| 6,751,501 B1 | 6/2004 | Schuler et al. | |
| 7,013,202 B2 | 3/2006 | Farina et al. | |
| 8,301,386 B1 | 10/2012 | Redmond et al. | |
| 8,639,376 B2 | 1/2014 | Grove et al. | |
| 8,660,706 B2 | 2/2014 | Szemkus | |
| 9,298,917 B2 | 3/2016 | Uner et al. | |
| 9,363,336 B2 * | 6/2016 | Lawson | G05B 19/4185 |
| 9,401,839 B2 | 7/2016 | Kidwell et al. | |
| 9,551,986 B2 | 1/2017 | Lo | |
| 2009/0187344 A1 * | 7/2009 | Brancaccio | G01R 19/2513 702/4 |
| 2010/0299120 A1 | 11/2010 | Engel | |
| 2010/0332149 A1 * | 12/2010 | Scholpp | C02F 1/008 702/25 |
| 2012/0084400 A1 * | 4/2012 | Almadi | H04L 41/069 709/219 |
| 2013/0144405 A1 | 6/2013 | Lo | |
| 2014/0148921 A1 | 5/2014 | Kwak | |

(Continued)

*Primary Examiner* — Zachary K Huson

(57) ABSTRACT

Method and system for automatically generating data points in a data management system. A control strategy and variables used in the control strategy can be configured, wherein the control strategy governs a data management system associated with a controller. The control strategy and the variables can be downloaded to the controller after configuring the control strategy and variables. The control strategy is then run on the controller and published to the data management system before, during, or after downloading of the control strategy. All available variables in the controller are then automatically listed so as to generate data points that can be downloaded and updated through a communication channel between the data management system and the controller.

20 Claims, 4 Drawing Sheets

(56) References Cited

U.S. PATENT DOCUMENTS

| | | |
|---|---|---|
| 2017/0038754 A1 | 2/2017 | Lo et al. |
| 2017/0046458 A1* | 2/2017 | Meagher ............... H02J 13/001 |
| 2017/0085438 A1 | 3/2017 | Link et al. |
| 2017/0109524 A1 | 4/2017 | Kolacinski et al. |

* cited by examiner

EFFICIENT METHOD AND SYSTEM FOR AUTOMATICALLY GENERATING DATA POINTS IN A SCADA SYSTEM

TECHNICAL FIELD

Embodiments are related to SCADA (Supervisory Control and Data Acquisition) systems. Embodiments also relate to PLC (Programmable Logic Controller) devices, systems, and methods. Embodiments additional relate to systems and techniques for decreasing the amount of time necessary to configure points in a SCADA system for communication with a PLC.

BACKGROUND

SCADA systems and architectures provide process supervisory control and data collection capabilities used to operate most industrial systems today. Most industrial processes and machines are also controlled by SCADA systems using industrial controllers such as PLCs.

A programmable logic controller (PLC) is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system.

PLCs are utilized in various industrial settings to control production devices and other automation devices which generate a large amount of data in their daily operations. This data may include, for example, sensor data, actuator and control program parameters, and information associated with service activities. However, conventional automation systems, and conventional PLCs in particular, are not capable of fully utilizing this data. For example, in most systems, due to hardware and software limitations, only a small fraction of this data can be analyzed and stored. Massive amounts of irrelevant data may be produced while important data points are missed. Compression may be applied at the higher automation layers on unimportant data, while important data is lost while travelling through the automation layers.

In basic SCADA architectures, information from sensors or manual inputs can be sent to the PLCs, which then send that information to computers with SCADA software. The SCADA software analyzes and displays the data in order to help operators and other workers in reducing waste while improving efficiency in the manufacturing process.

One of the difficulties with such conventional systems is that it takes a great deal of time to configure the SCADA system, particularly for the data point configuration to allow the SCADA system to attain the correct live data from controllers. Accordingly, there exists a need for an efficient technique for automatically generating data points in a SCADA system.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method and system for managing a SCADA system.

It is another aspect of the disclosed embodiments to provide for a method and system for automatically generating data points in a data management system such as a SCADA system.

The aforementioned aspects and other objectives and advantages can now be achieved as described herein. Method and system for automatically generating data points in a data management system are disclosed. In an example embodiment, a control strategy and variables used in the control strategy can be configured, wherein the control strategy governs a data management system (e.g., a SCADA system) associated with a controller (e.g., a PLC). The control strategy and the variables can be downloaded to the controller after configuring the control strategy and variables. The control strategy is then run on the controller and published to the data management system before, during, or after downloading of the control strategy. All, or a selection of, available variables in the controller can then be automatically listed so as to generate data points that can be downloaded and updated through a communication channel between the data management system and the controller.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. As used herein, the term "and/or" includes any and all combinations of one or more of the associated listed items.

Reference will be made in detail to the disclosed embodiments (exemplary embodiments) of the invention, examples of which are illustrated in the accompanying drawings, and which may be preferred or alternative embodiments. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected.

Figure 1:
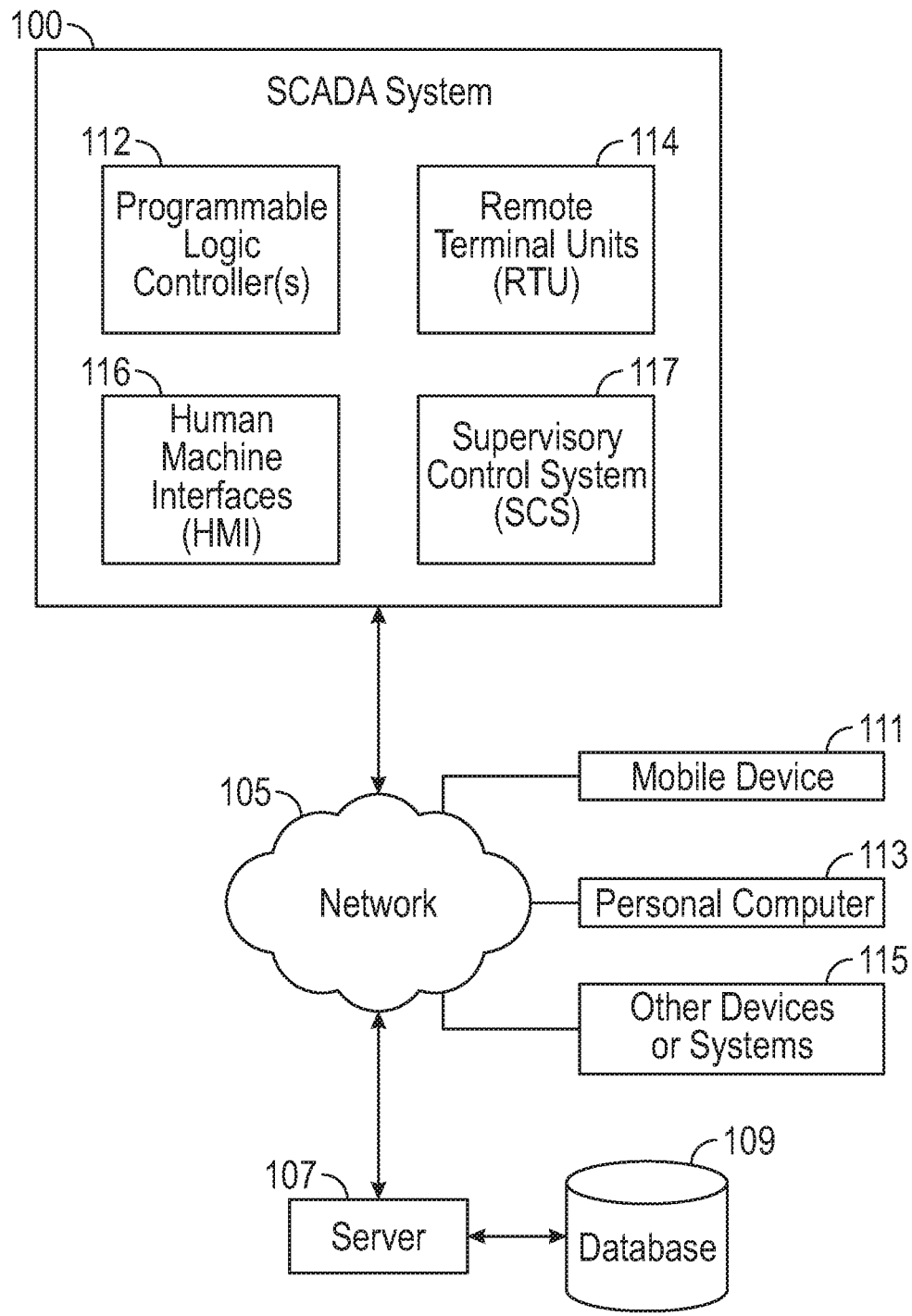
FIG. 1 illustrates a system block diagram depicting a SCADA system, which may be implemented in accordance with an example embodiment.

FIG. 1 illustrates a system block diagram depicting an example SCADA system 100, which may be implemented in accordance with an example embodiment. As shown in FIG. 1, the SCADA system 100 can include one or more PLC (Programmable Logic Controller) 112, one or more RTU (Remote Terminal Unit) 114, one or more HMI (Human Machine Interface) 116, and at least one SCS (Supervisory Control System) 117. The SCADA system 100 can communicate via bidirectional communications with a network 105, which in turn is associated with at least one server 107 that communicates with a database 109. As will be discussed in greater detail herein, the server 107 and/or the database 109 may be external to the SCADA system 100 or may form a part of the SCADA system 100. In some cases, the server 107 may actually be the SCS 117. Thus, many variations and alternative implementations to FIG. 1 are possible.

In some example embodiments, the network 105 may be implemented as a WAN (Wide Area Network), LAN (Local Area Network), a wireless network, a cellular network, the Internet, etc., or combinations thereof. The network 105 can communicate with a variety of client devices, such as a mobile device 111 (e.g., a smartphone, a tablet computing device, a wearable computing device, a laptop computer, etc.), one or more personal computers 113, and/or other devices or systems 115. Thus, devices 111, 113, 115 are examples of clients devices that can communicate wirelessly with the SCADA system 100 through the wireless network 105. It can be assumed that the network communications between the network 105 and the SCADA system 100 and the devices 111, 113, 115, and the server 107 can take place through secured communications or that network 105 is a secure network. Note that server(s) 107 contains memory and processor components, which can store and process operations such as those shown and described in greater detail herein.

Note that although the server 107 and the database 109 are depicted in FIG. 1 as being external to the SCADA system 100, it can be appreciated that in some example embodiments, the server 107 and database 109 may be contained within or as a part of system the SCADA system 100. In other words, embodiments can vary and the exact illustration shown in FIG. 1 is not considered a limiting feature of the disclosed embodiments.

In some embodiments, for example, the server 107 and database 109 may not be necessary or may simply be components of, for example, the network 105 and facilitate communications with networked devices such as the devices 111, 113, 115, and so on. In other example embodiments, the devices 111, 113, 115 may be configured to communicate directly with the SCADA system 100 rather than through a separate network 105 and so on. In still other example embodiments, as discussed above, the server 107 and database 109 may actually be a part of the SCADA system 100. In some example embodiments, the server 107 may actually implement the SCS 117, in which case the SCS 117 and server 107 are one and the same and in the situation form a part of the SCADA system 100.

The network 105 depicted in FIG. 1 can couple devices so that communications may be exchanged, such as between a server and a client device or other types of devices, including between wireless devices coupled via a wireless network, for example. The network 105 can also include mass storage, such as network-attached storage (NAS), a storage area network (SAN), or other forms of computer or machine-readable media, for example. The network 105 may include the Internet, one or more Local Area Networks (LANs), one or more Wide Area Networks (WANs), wireline type connections, wireless type connections, or any combination thereof. Likewise, sub-networks may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example. Thus, the bidirectional arrows shown in FIG. 1 represent examples of communication links or channels.

The network 105 (e.g., a wireless network) can couple client devices such as devices 111, 113, 115, etc., with the network 105. That is, such a wireless network may employ stand-alone ad-hoc networks, mesh networks, wireless LAN (WLAN) networks, cellular networks, or the like. The network 105 can further include a system of terminals, gateways, routers, or the like coupled by wireless radio links, or the like, which may move freely, randomly, or organize themselves arbitrarily, such that network topology may change, at times even rapidly. The network 105 may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

The network 105 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Note that signal packets communicated via a network, such as a network of participating digital communication networks (e.g., networks 105, 110) may be compatible with or compliant with one or more protocols. Signaling formats or protocols employed may include, for example, OPC UA, TCP/IP, UDP, DECnet, NetBEUI, IPX, AppleTalk, or the like. Versions of the Internet Protocol (IP) may include IPv4 or IPv6. It should be appreciated, of course, that such formats are mentioned for general illustrative purposes only and are not considered limiting features of the disclosed embodiments.

The Internet refers to a decentralized global network of networks. The Internet includes Local Area Networks (LANs), Wide Area Networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc., that may route the signal packet in accordance with a target address and availability of a network path to the target address.

Figure 2:
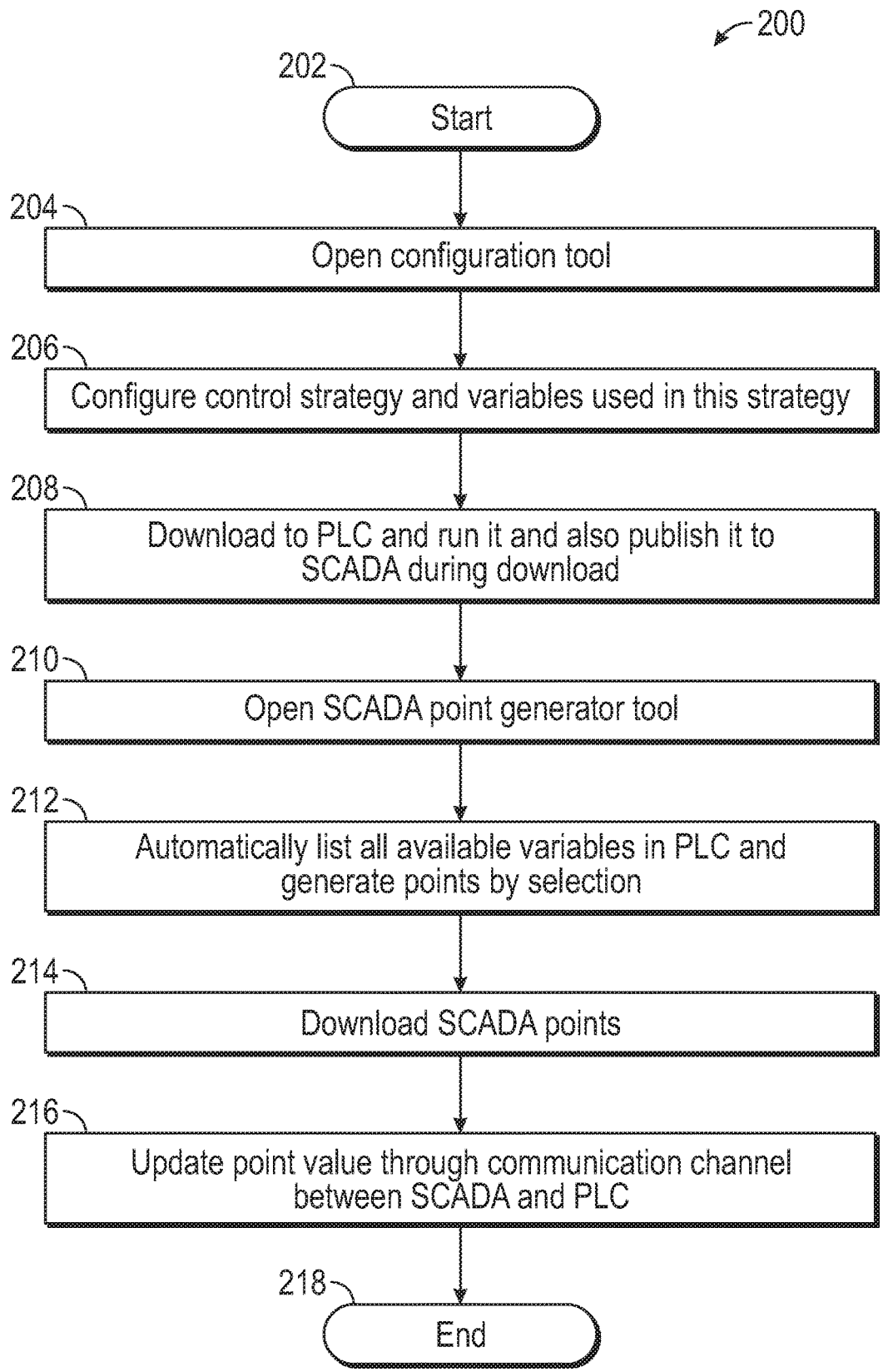
FIG. 2 illustrates a flow chart of operations depicting logical operational steps of a method for automatically generating data points in a SCADA system, in accordance with an example embodiment.

FIG. 2 illustrates a flow chart of operations depicting logical operational steps of a method 200 for automatically generating data points in a SCADA system, in accordance with an example embodiments. It should be appreciated that that operations shown in FIG. 2 are only example operations and that the method 200 may include other operations or steps or variations thereof. The method 200 can be implemented to generate points in a SCADA system such as, for example, the SCADA system 100 shown in FIG. 1. As indicated at block 202, the process can begin. As shown next at block 204, a step, operation, or instruction can be implemented in which a configuration tool is opened.

One example of a configuration tool that can be utilized in the context of the operation depicted at block 204 is the IEC 61131-3 configuration tool. Note that IEC 61131-3 refers to the third part (of 10) of the open International Standard IEC 61131 for programmable logic controllers and was first published in December 1993 by the IEC (International Electrotechnical Commission). The current (third) edition was published in February 2013. Part 3 of IEC 61131 deals with basic software architecture and programming languages of the control program for a PLC, and defines graphical and textual programming standards.

Following processing of the operation depicted at block 206, a step, operation, or instruction can be implemented to configure a control strategy and variables used in this strategy. Then, as indicated at block 208, a step, operation, or instruction can be implemented to download the control strategy to controllers such as the RTU 114 or PLC 112 or other types of controllers, and run it and also publish it to the SCADA (e.g., SCADA system 100) before, during, or after download. Note that although the illustration of FIG. 2 indicates "during download," it should be appreciated that example "publish" embodiments may occur before, during, or after the download rather than simply during the download. Again, the FIG. 1 illustration is for exemplary purposes. Next, as shown at block 210, a step, operation, or instruction can be implemented in which a point generator tool (e.g., such as, but not limited to, a SCADA point generator tool) is opened. Note that the point generator tool can be implemented as a separate tool or may be implemented in the context of, for example, the IEC 61131 programming tool discussed above. In other words, the point generator tool may or may not be a separate tool.

Next, as illustrated at block 212, a step, operation, or instruction can be implemented to automatically list all available variables in the PLC (e.g., PLC 112) and generate points by selection. Then, as shown at block 214, a step, operation, or instruction can be implemented to download the SCADA points (e.g., data points). Thereafter, as depicted at block 216, a step, operation, or instruction can be implemented to update the points value (or values) through a communication channel between the SCADA (e.g., SCADA system 100) and the PLC (e.g., PLC 112). The process can then end, as shown at block 218.

The method 200 shown in FIG. 2 thus can provide for a process of using an exported control strategy to automatically generate points in a SCADA system such as the example SCADA system 100 shown in FIG. 1. For example, the "publish to SCADA during download" operation may be achieved through an export or similar solution. The control strategy can be configured with a configuration tool as discussed above and then the control strategy is downloaded to the controller (e.g., PLC 112). In the solution offered by method 200, the control strategy can be exported automatically (see above comment regarding "export of similar solution") to the SCADA system 100 with the information needed by point generation in the SCADA system 100.

Figure 3:
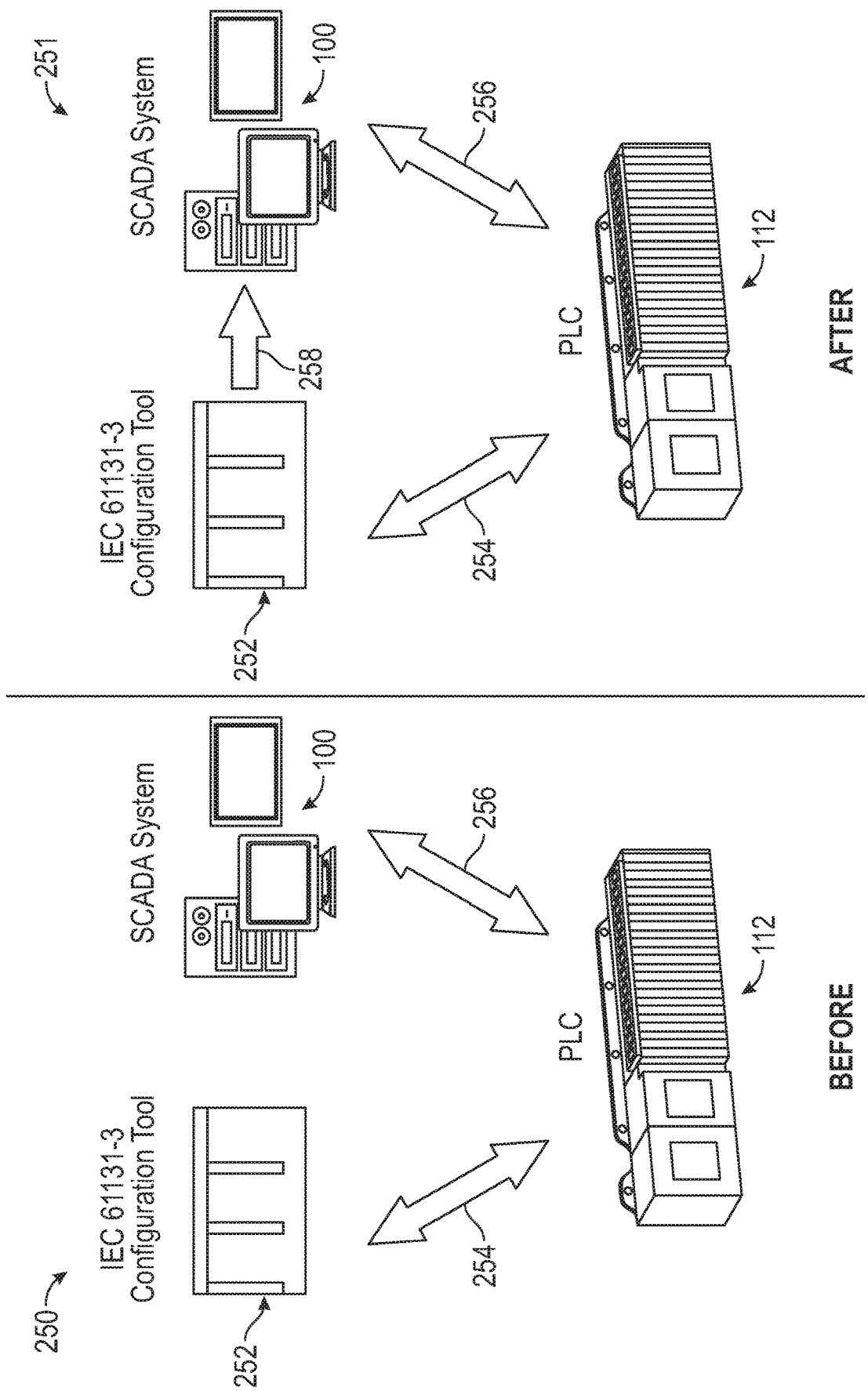
FIG. 3 illustrates a schematic diagram comparing before and after implementations of the disclosed method for automatically generating data points in a SCADA system, in accordance with an example embodiment.

FIG. 3 illustrates a schematic diagram comparing respective before and after implementations 250 and 251 of the disclosed method 200 for automatically generating data points in a SCADA system, in accordance with an example embodiment. As shown in the "before" implementation 250 in FIG. 3, the configuration tool 252 and the SCADA system 100 separately communicate with the PLC 112 (or PLCs) as indicated by the bidirectional communication links 254 and 256. The "before" arrangement takes a great deal of time to configure the SCADA system 100, especially for the data point configuration to allow the SCADA system 100 to attain the correct live data from the controllers such as PLC 112. In the "after" implementation 251 shown in FIG. 3, however, the configuration tool 252 provides data/information directly to the SCADA system 100, as indicated by the arrow 258, which allows for automatically generating points in the SCADA system 100 as discussed herein.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object-oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer (e.g., such as personal computer 113, the mobile device 111, or other devices systems 115 shown in FIG. 1), partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
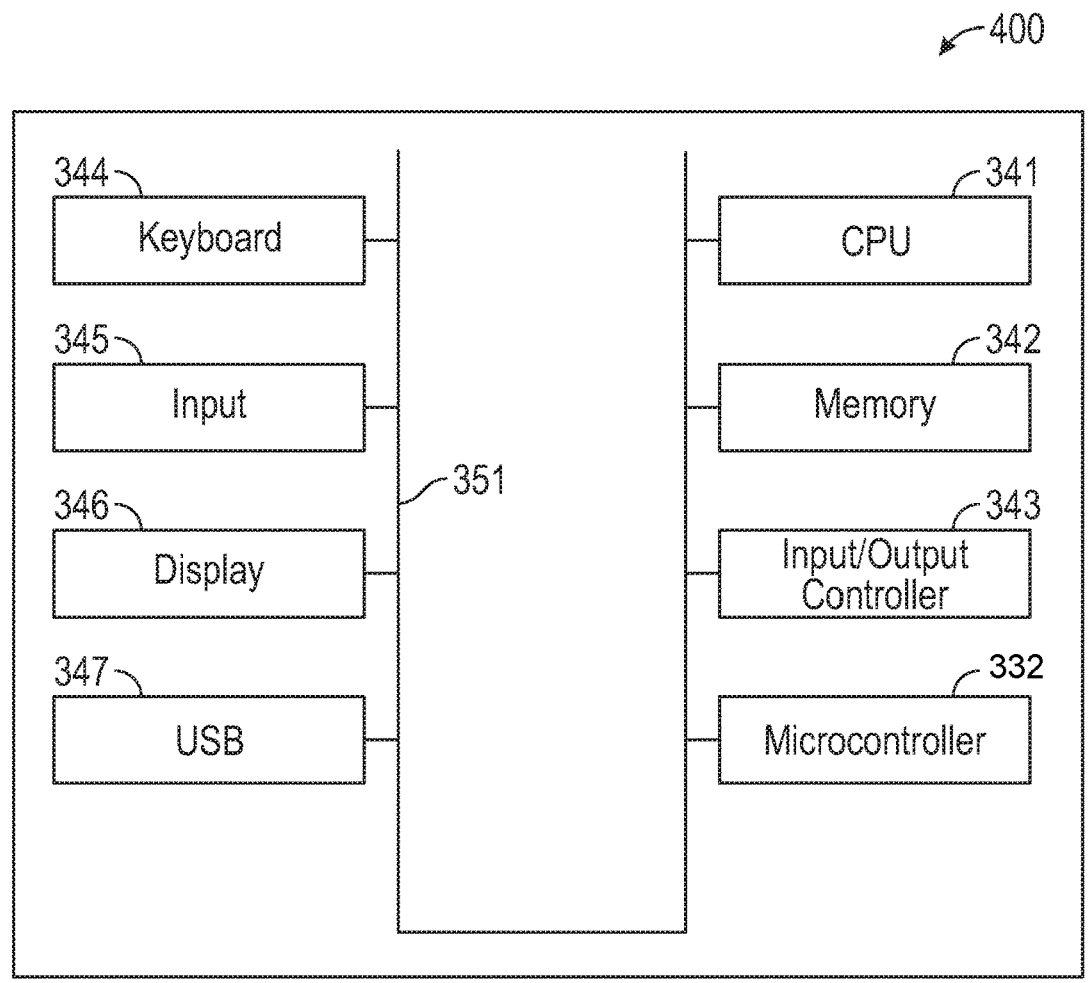
FIG. 4 illustrates a schematic view of a computer system/apparatus, which can be implemented in accordance with an example embodiment.
Figure 5:
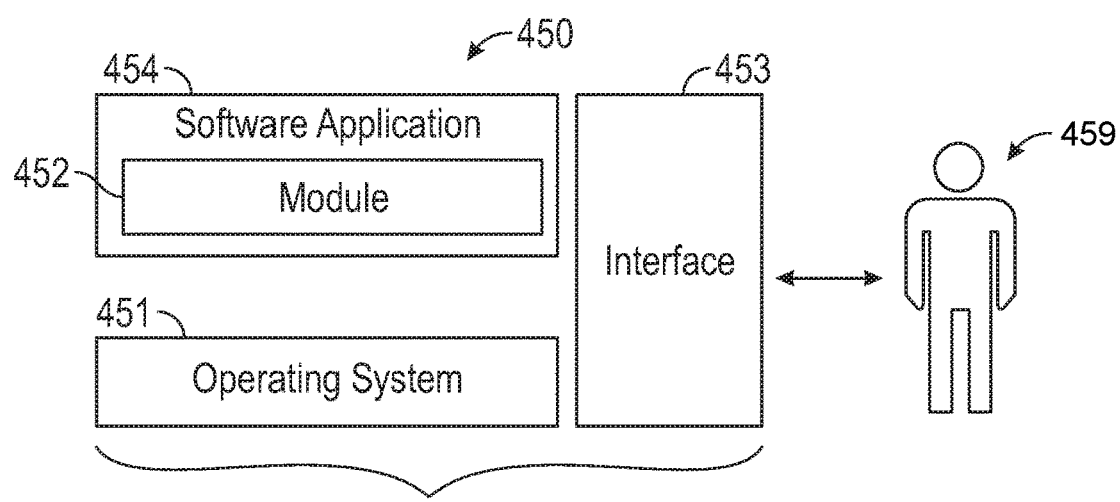
FIG. 5 illustrates a schematic view of a software system including a module, an operating system, and a user interface, which can also be implemented in accordance with an example embodiment.

FIGS. 4-5 are shown only as exemplary diagrams of data-processing environments in which example embodiments may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, some example embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system/apparatus 400 can communicate electronically through a system bus 351 or similar architecture. The system bus 351 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server). The data-processing system/apparatus 400 may be implemented in some embodiments as, for example, the server 107 shown in FIG. 1 and/or the personal computer 113, the mobile device 111, and/or the other devices or systems 115, etc.

In other example embodiments, data-processing system/apparatus 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc.).

FIG. 5 illustrates a computer software system/apparatus 450 for directing the operation of the data-processing system/apparatus 400 depicted in FIG. 4. Software application 454, stored for example in memory 342, generally includes a kernel or operating system 451 and a shell or interface 453. One or more application programs, such as software application 454, may be "loaded" (i.e., transferred from, for example, mass storage or another memory location into the memory 342) for execution by the data-processing system/apparatus 400. The data-processing system/apparatus 400 can receive user commands and data through the interface 453; these inputs may then be acted upon by the data-processing system/apparatus 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the various instructions or operations such as those discussed herein with respect to FIGS. 1-3 herein. Module 452 may also be composed of a group of modules or sub-modules that implement particular instructions, steps, or operations, such as discussed and illustrated herein with respect to FIGS. 1-3.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 4-5 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. For example, some embodiments may be implemented in the context of a special-purpose computer instead of a general-purpose computer or vice versa.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media.

Additionally, the operations of a method or algorithm may reside as one or any combination or set of codes and/or instructions on a machine readable medium and/or computer-readable medium, which may be incorporated into a computer program product.

Based on the foregoing, it can be appreciated that a number of example embodiments are disclosed herein. For example, in one embodiment, a method for automatically generating data points in a data management system can be implemented. Such a method can include steps, operations, or instructions such as, for example: configuring a control strategy and variables used in the control strategy, wherein the control strategy governs a data management system associated with at least one controller; downloading the control strategy including the variables to the at least one controller of the data management system after the control strategy has been configured; running the control strategy on the at least one controller and publishing the control strategy to the data management system before, during, or after the downloading of the control strategy; and automatically listing all available variables among the variables in the at least one controller after the running and the publishing of the control strategy so as to generate data points thereof that are thereafter downloaded and updated through a communication channel between the data management system and the at least one controller.

In some example embodiments, the aforementioned data management system may be a SCADA (Supervisory Control and Data Acquisition) system. In another example embodiment, the aforementioned at least one controller may be a PLC (Programmable Logic Controller). In yet another example embodiment, the control strategy and the variables used in the control strategy can be configured with a configuration tool. In some example embodiments, the data points can be generated with a point generator tool.

In yet another example embodiment, a system for automatically generating data points in a data management system can be implemented Such a system can include, for example, at least one processor and a non-transitory computer-usable medium embodying computer program code. The computer-usable medium is capable of communicating with the at least one processor, and computer program code can include instructions executable by the at least one processor and configured for: configuring a control strategy and variables used in the control strategy, wherein the control strategy governs a data management system associated with at least one controller; downloading the control strategy including the variables to the at least one controller of the data management system after the control strategy has been configured; running the control strategy on the at least one controller and publishing the control strategy to the data management system before, during, or after the downloading of the control strategy; and automatically listing all available variables among the variables in the at least one controller after the running and the publishing of the control strategy so as to generate data points thereof that are thereafter downloaded and updated through a communication channel between the data management system and the at least one controller.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method for automatically generating data points in a data management system, said method comprising:
configuring a control strategy and variables used in said control strategy, wherein said control strategy governs a data management system associated with at least one controller that receives information from at least one of: at least one sensor and at least one manual input, wherein said information is subsequently sent to said data management system for analysis and display;
downloading said control strategy including said variables to said at least one controller of said data management system after said control strategy has been configured;
running said control strategy on said at least one controller and publishing said control strategy to said data management system before said downloading of said control strategy, during said downloading of said control strategy, or after said downloading of said control strategy; and
automatically listing all available variables among said variables in said at least one controller after said running and said publishing of said control strategy so as to generate data points thereof that are thereafter downloaded and updated through a communication channel between said data management system and said at least one controller, said data points comprising important data points as distinguished from unimportant data or irrelevant data.

2. The method of claim 1 wherein said data management system comprises a SCADA (Supervisory Control and Data Acquisition) system and wherein said data points comprise SCADA points.

3. The method of claim 2 further comprising:
automatically listing in said at least one controller, all available variables among said variables; and
generating said data points by selection, wherein said at least one controller comprises a PLC (Programmable Logic Controller), wherein said data points are downloaded and updated through the communication channel between the PLC and the data management system.

4. The method of claim 3 wherein said control strategy and said variables used in said control strategy are configured with a configuration tool.

5. The method of claim 2 further comprising generating said data points with a point generator tool.

6. The method of claim 5 wherein said point generator tool comprises a SCADA point generator tool that generates the SCADA points.

7. The method of claim 4 further comprising generating said data points with a point generator tool.

8. The method of claim 4 wherein:
said SCADA system includes a PLC, an RTU (Remote Terminal Unit), an HMI (Human Machine Interface), and an SCS (Supervisory Control System), wherein said at least one controller comprises said PLC; and
a point value among said data points is updated through a communication channel between said SCADA system and said PLC; and
said configuration tool comprises an IEC (International Electrotechnical Commission) 61131-3 configuration tool.

9. A system for automatically generating data points in a data management system, said system comprising:

at least one processor; and a non-transitory computer-usable medium embodying computer program code, said computer-usable medium capable of communicating with said at least one processor, said computer program code comprising instructions executable by said at least one processor and configured for:

configuring a control strategy and variables used in said control strategy, wherein said control strategy governs a data management system associated with at least one controller that receives information from at least one of: at least one sensor and at least one manual input, wherein said information is subsequently sent to said data management system for analysis and display;

downloading said control strategy including said variables to said at least one controller of said data management system after said control strategy has been configured;

running said control strategy on said at least one controller and publishing said control strategy to said data management system before said downloading of said control strategy, during said downloading of said control strategy, or after said downloading of said control strategy; and automatically listing all available variables among said variables in said at least one controller after said running and said publishing of said control strategy so as to generate data points thereof that are thereafter downloaded and updated through a communication channel between said data management system and said at least one controller, said data points comprising important data points as distinguished from unimportant data or irrelevant data.

10. The system of claim 9 wherein said data management system comprises a SCADA (Supervisory Control and Data Acquisition) system and wherein said data points comprise SCADA points.

11. The system of claim 10 wherein said instructions are further configured for:

automatically listing in said at least one controller, all available variables among said variables; and generating said data points by selection, wherein said at least one controller comprises a PLC (Programmable Logic Controller), wherein said data points are downloaded and updated through the communication channel between the PLC and the data management system.

12. The system of claim 11 wherein said control strategy and said variables used in said control strategy are configured with a configuration tool.

13. The system of claim 10 wherein said instructions are further configured for generating said data points with a point generator tool.

14. The system of claim 13 wherein said point generator tool comprises a SCADA point generator tool that generates the SCADA points.

15. The system of claim 10 wherein said instructions are further configured for generating said data points with a point generator tool.

16. The system of claim 12 wherein said instructions are further configured for generating said data points with a point generator tool.

17. The system of claim 16 wherein:

said SCADA system includes a PLC, an RTU, an HIM (Human Machine Interface), and an SCS (Supervisory Control System), wherein said at least one controller comprises said PLC;

a point value among said data points is updated through a communication channel between said SCADA system and said PLC; and said configuration tool comprises an IEC (International Electrotechnical Commission) 61131-3 configuration tool.

18. A system for automatically generating data points in a data management system, said system comprising:

a data management system associated with at least one controller, wherein a control a control strategy and variables used in said control strategy are configured, said control strategy governing said data management system associated with said at least one controller that receives information from at least one of: at least one sensor and at least one manual input, wherein said information is subsequently sent to said data management system for analysis and display;

wherein said control strategy is downloadable, including said variables to said at least one controller of said data management system after said control strategy has been configured;

wherein said control strategy is run on said at least one controller and published to said data management system before downloading of said control strategy, during said downloading of said control strategy, or after said downloading of said control strategy; and wherein all available variables among said variables are automatically listed in said at least one controller after said running and said publishing of said control strategy so as to generate data points thereof that are thereafter downloaded and updated through a communication channel between said data management system and said at least one controller, said data points comprising important data points as distinguished from unimportant data or irrelevant data.

19. The system of claim 18 wherein said data management system comprises a SCADA (Supervisory Control and Data Acquisition) system comprising a PLC, an RTU (Remote Terminal Unit), an HMI (Human Machine Interface), and an SCS (Supervisory Control System), wherein said at least one controller comprises said PLC, and wherein a point value among said data points is updated through a communication channel between said SCADA system and said PLC.

20. The system of claim 18 wherein:

said control strategy and said variables used in said control strategy are configured with a configuration tool and said data points are generated with a point generator tool;

all available variables among said variables are automatically listed in said at least one controller;

said data points are generated by selection; and said at least one controller comprises at least one of: a PLC (Programmable Logic Controller) and an RTU (Remote Terminal Unit).

* * * * *